United States Patent
Arora et al.

(10) Patent No.: US 7,760,486 B2
(45) Date of Patent: *Jul. 20, 2010

(54) ALUMINUM ELECTROLYTIC CAPACITORS UTILIZING FINE FIBER SPACERS

(75) Inventors: Pankaj Arora, Chesterfield, VA (US); Simon Frisk, Richmond, VA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 139 days.

This patent is subject to a terminal disclaimer.

(21) Appl. No.: 11/895,912

(22) Filed: Aug. 28, 2007

(65) Prior Publication Data

US 2009/0059475 A1 Mar. 5, 2009

(51) Int. Cl.
*H01G 9/02* (2006.01)
(52) U.S. Cl. .................................... 361/512
(58) Field of Classification Search ......... 361/508–512, 361/529–530
See application file for complete search history.

(56) References Cited

U.S. PATENT DOCUMENTS

| | | | |
|---|---|---|---|
| 3,661,645 A | | 5/1972 | Strier et al. |
| 3,676,752 A | * | 7/1972 | Burger et al. ............. 361/505 |
| 4,480,290 A | * | 10/1984 | Constanti et al. .......... 361/512 |
| 5,415,959 A | | 5/1995 | Pyszczek et al. |
| 5,881,721 A | * | 3/1999 | Bunce et al. ............ 128/203.21 |
| 5,902,696 A | | 5/1999 | Smesko et al. |
| 5,948,464 A | * | 9/1999 | Delnick ....................... 427/77 |
| 6,148,503 A | * | 11/2000 | Delnick et al. ............. 29/623.1 |
| 6,638,988 B2 | * | 10/2003 | Takata et al. ............... 521/143 |
| 6,730,439 B2 | | 5/2004 | Kamei et al. |
| 7,112,389 B1 | * | 9/2006 | Arora et al. ............... 429/128 |
| 7,170,739 B1 | | 1/2007 | Arora et al. |
| 2002/0045091 A1 | | 4/2002 | Kamei et al. |
| 2003/0169559 A1 | | 9/2003 | Honda et al. |

FOREIGN PATENT DOCUMENTS

| | | |
|---|---|---|
| JP | 2000348980 | 12/2000 |
| JP | 2002343329 | 11/2002 |
| WO | WO 03/080905 A1 | 10/2003 |

OTHER PUBLICATIONS

U.S. Appl. No. 11/523,827, filed Sep. 20, 2006, Arora et al.
PCT International Search Report and Written Opinion for International Application No. PCT/US2008/074408 dated Aug. 27, 2008.

* cited by examiner

*Primary Examiner*—Eric Thomas

(57) ABSTRACT

The present invention provides an aluminum electrolytic capacitor having a cathode, an anode and an improved spacer comprised of polymeric nanofibers. The nanofiber spacer offers low ionic resistance, desirable barrier properties and high electrolyte absorption. The use of the improved spacer results in devices having higher capacitance, lower ESR, less heat generation and improved capacitor manufacturing efficiency.

9 Claims, 3 Drawing Sheets

ALUMINUM ELECTROLYTIC CAPACITORS UTILIZING FINE FIBER SPACERS

BACKGROUND OF THE INVENTION

The present invention relates to the field of aluminum electrolytic capacitors which include spacers comprising a porous layer of polymeric nanofibers.

Aluminum electrolytic capacitors are energy storage devices typically including an etched aluminum foil anode, an aluminum foil or film cathode, and a spacer interposed there between impregnated with a liquid electrolytic solution. The electrolytic solution provides ionic electrical conductivity from the cathode to an oxide layer formed on the aluminum anode which functions as a dielectric layer between the anode and the cathode. The multiple components are together rolled into a cylindrical body and encased, with the aid of suitable insulation, in an aluminum canister. Aluminum electrolytic capacitors can also be made with conductive polymer in place of liquid electrolytes. In these types of cells the spacers are used during cell winding and the rolled structures are then impregnated with the conductive polymer.

The spacer materials commonly used in aluminum electrolytic capacitors are papers, such as cellulosic papers. Aluminum electrolytic capacitors using these paper spacers desirably have a high level of protection against short-circuiting, but undesirably exhibit high ionic resistance and poor electrolyte absorption. Reduction of the density of the paper improves the ionic resistance and electrolyte absorption of the spacer at the expense of unacceptably increasing the tendency of the capacitor to short-circuit. In order to achieve the necessary balance between the electrolyte absorption of the spacer and the barrier to short-circuiting, at least one open porous layer of spacer paper is commonly combined with at least one dense layer of spacer paper. The resulting multiple layer structure provides adequate barrier properties and electrolyte absorption but the ionic resistance of the spacer is undesirably very high which leads to high ESR (equivalent series resistance) for the capacitor. Multiple layers of papers also result in thicker spacers, which in turn results in a device having lower capacitance.

Another problem with paper spacers for use in aluminum electrolytic capacitors is the nonuniform nature of the papers used, frequently containing particle impurities or void type defects. At higher voltages, these nonuniformities can lead to direct current leakage or even failure of the capacitors. Thus more than one layer of paper, typically 2 to 6 layers, are used to mask these nonuniformities and generally achieve good electrical properties. Use of more than one layer of paper increases the capacitor size or reduces the capacitance and also presents problems in evenly rolling the electrodes and paper spacers. Use of multiple layers can also lead to higher ESR because of poor contact between different layers of the spacers. All the above issues are undesirable and can lead to performance and manufacturing efficiency loss.

Polymer spacers, in the form of microporous film or fabric, have also been used in aluminum electrolytic capacitors. An example of a capacitor spacer formed from polytetrafluoroethylene microporous film is disclosed in U.S. Pat. No. 3,661,645 to Strier et al. U.S. Pat. No. 5,415,959 to Pyszeczek et al. describes the use of woven fabrics of synthetic halogenated polymers as capacitor spacers. The use of "hybrid" spacers comprising polymer (porous film made from polypropylene or polyester) and paper material is disclosed in U.S. Pat. No. 4,480,290 to Constanti et al. A major problem with the use of microporous film spacers in aluminum electrolytic capacitors is that the ionic resistance is usually unacceptably high. It is believed that sufficient electrolyte is not allowed to contact the electrodes as a result of the inherent limited porosity of microporous film spacers. Nonwoven fabrics made with large fiber size offer low ionic resistance but they are usually very thick and non-uniform leading to poor barrier properties.

There is a need for aluminum electrolytic capacitors having increased life and improved performance, and for improved aluminum electrolytic capacitor spacers having a desirable balance of thickness, electrolyte absorption, ionic resistance and barrier to short-circuiting.

BRIEF SUMMARY OF THE INVENTION

The present invention is directed to an aluminum electrolytic capacitor comprising a spacer comprising a porous nanofiber layer comprising fibers having a mean diameter in the range from about 50 nm to about 1000 nm, wherein the porous nanofiber layer has a mean flow pore size of between about 0.01 µm and about 5 µm, a thickness of between about 1 µm and about 90 µm, a porosity of between about 20% and about 90%, and a Frazier air permeability of less than about 25 $cfm/ft^2$ (7.6 $m^3/min/m^2$).

DETAILED DESCRIPTION OF THE INVENTION

Figure 1:
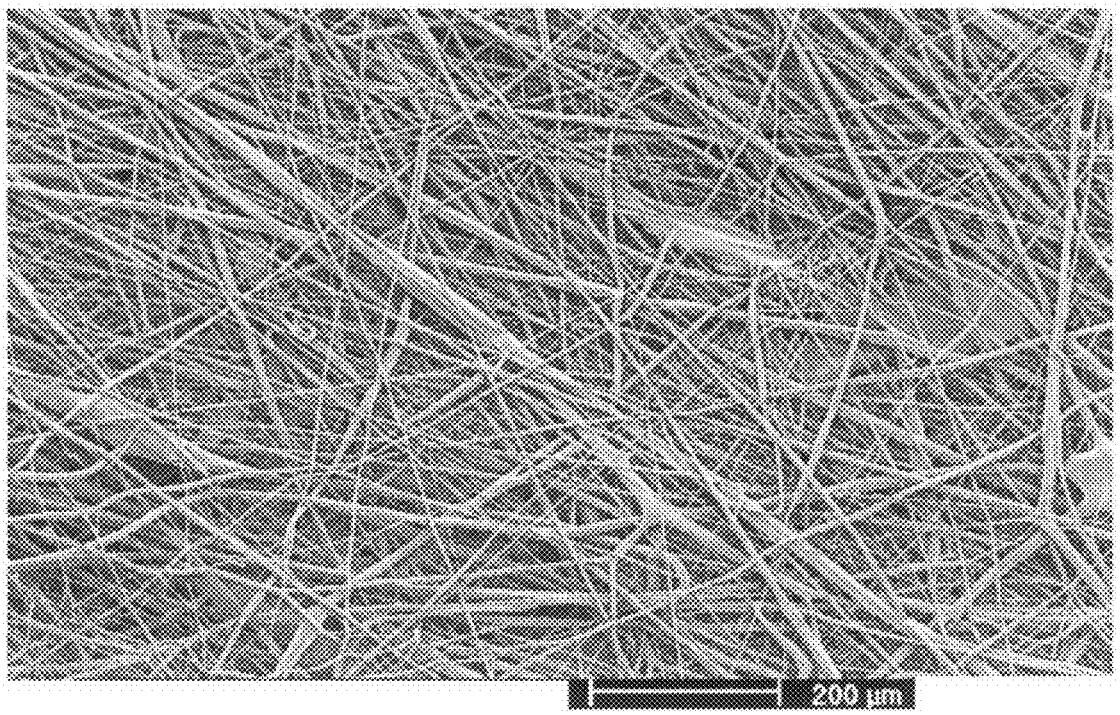
FIG. 1 is a scanning electron micrograph of an aluminum electrolytic capacitor spacer in accordance with the invention. The spacer offers a combination of low resistance and highly desirable barrier properties.

The present invention provides an aluminum electrolytic capacitor including an etched aluminum foil anode, an aluminum foil or film cathode, and a porous polymeric nanofiber spacer interposed there between. The spacer is impregnated with a liquid electrolytic solution or with a conductive polymer. The liquid electrolyte solution contains a polar solvent and at least one salt selected from inorganic acids, organic acids, inorganic acid salts, and organic acid salts. The capacitor spacer includes at least one layer made from polymeric nanofibers having improved combinations of stability at high temperatures, good barrier properties against short-circuiting and lower ionic resistance.

The capacitor of the present invention includes two conducting aluminum foils, one of which is coated with an insulating oxide layer, and further includes a spacer soaked in electrolyte. The aluminum foil which is coated with an oxide layer is the anode while the liquid electrolyte and the second foil acts as the cathode. This multilayer assembly is then rolled up, fitted with pin connectors and placed in a cylindrical aluminum casing. The foils are high purity aluminum and are chemically etched with billions of microscopic tunnels to increase the surface area in contact with the electrolyte. The anode foil carries the capacitor's dielectric, which is a thin layer of aluminum oxide ($Al_2O_3$) chemically grown on the anode foil. The electrolyte is a blend of ingredients with different formulations according to voltage and operating temperature range. The principal ingredients are a solvent and a conductive salt as a solute to produce electrical conduction. Common solvents are ethylene glycol (EG), dimethyl formamide (DMF) and gammabutralactone (GBL). Common solutes are ammonium borate and other ammonium salts. A small amount of water is added to the electrolyte to maintain the integrity of the aluminum oxide dielectric. The spacer prevents the foil electrodes from contacting each other and shorting, and the spacer holds the reservoir of electrolyte. As previously stated, multiple layers of paper are commonly used as spacers between the aluminum foils.

The spacer includes at least one porous layer comprising polymeric nanofibers having a mean diameter in the range of between about 50 nm and about 1000 nm, even between about 50 nm and about 500 nm. The term "nanofibers" refers to fibers having diameters of less than 1,000 nanometers. Fibers having diameters in these ranges provide a spacer structure with high surface area which results in good electrolyte absorption and retention due to increased electrolyte contact.

The spacer has a mean flow pore size of between about 0.01 µm and about 5 µm, even between about 0.01 µm and about 1 µm. Smaller pore size reflects good barrier properties of the spacer. The spacer has a porosity of between about 20% and about 90%, even between about 40% and about 70%. The high porosity of the spacer also provides for good electrolyte absorption and retention in the capacitor of the invention and also leads to lower resistance.

The basis weight of the nanofiber layer can be between about 1 gsm and about 60 gsm, even between about 10 gsm and about 40 gsm. If the basis weight of the spacer is too high, the ionic resistance may be too high. If the basis weight is too low, the spacer may not be able to reduce shorting between the positive and negative electrode.

The thickness of the spacer can be between about 1 µm and about 90 µm, even between about 10 µm and about 50 µm, and even between about 10 µm and about 30 µm. The low thickness enables the manufacture of capacitors having increased capacity, since the thinner the spacer, the lower the overall thickness of the materials used in a capacitor; therefore more electrochemically active materials can be present in a given volume. The spacer is thick enough to prevent soft shorting between positive and negative electrode while allowing good flow of ions between the cathode and the anode. The thin spacers create more space for the electrodes inside a cell and thus provide for improved performance and life of the capacitors of the invention.

The spacer has a Frazier air permeability of less than about 25 cfm/ft$^2$ (7.6 m$^3$/min/m$^2$), even less than about 5 cfm/ft$^2$ (1.52 m$^3$/min/m$^2$). Lower air permeability refers to good barrier properties of the spacers. Thus spacers with low air permeability along with low ionic resistance are desirable.

Polymers suitable for use in the nanofiber layer(s) of the spacer include thermoplastic and thermosetting polymers that are substantially inert to the electrolyte solution intended for use in the capacitor of the invention. Such polymers include, but are not limited to, aliphatic polyamide, semi-aromatic polyamide, polyvinyl alcohol, cellulose, polypropylene, polyethylene, polyethylene terephthalate, polypropylene terephthalate, polybutylene terephthalate, polysulfone, polyvinylidene fluoride, polyvinylidene fluoride-hexafluoropropylene, polymethyl pentene, polyphenylene sulfide, polytetrafluoroethylene, ethylene tetrafluoroethylene, polyacetyl, polyurethane, aromatic polyamide and blends, mixtures and copolymers thereof.

A process for making the nanofiber layer(s) is electroblowing which is illustrated in International Publication Number WO2003/080905 (U.S. Ser. No. 10/822,325), hereby incorporated by reference. Electroblowing involves feeding a solution of a polymer in a solvent to a spinning nozzle in a spin pack to which a high voltage is applied, while compressed air is directed toward the polymer solution in a blowing gas stream as it exits the nozzle to form nanofibers and collecting the nanofibers into a web on a grounded collector under vacuum. Alternatively, the nanofiber layer(s) can be formed by electrospinning, or even by melt blowing in which a melt-processable polymer is extruded through a plurality of capillaries as molten streams into a high velocity gas (e.g. air) stream.

Spacers useful in the capacitors of the invention can comprise either a single layer of polymeric nanofibers or multiple layers. When the spacer comprises multiple layers, the multiple layers can be layers of the same polymeric fine fibers formed by multiple passes of the moving collection belt beneath the spin pack within the same process. The multiple layers can alternatively be layers of differing polymeric fine fibers, by laminating layers formed in separate spinning processes. The multiple layers can have differing characteristics including, but not limited to, thickness, basis weight, pore size, fiber size, porosity, air permeability, ionic resistance and tensile strength.

When layers formed in separate processes are laminated, the layers can be laminated by thermal calendering at a temperature lower than the melting point of the lowest melting polymer present and a pressure sufficient to achieve good bonding between the layers. The heat during thermal calendering is not so high as to fuse the pores of the layers as that will lead to high ionic resistance. Alternatively, the layers can be laminated by chemical bonding using any chemical which will assist in forming a bond between the layers which will also be stable in the electrolyte of the battery. Examples of such chemicals include polyvinyl alcohol, polyacrylic acids, grafted starch materials and carboxy-methylcellulose. Yet another method for forming the multilayer spacer is by directly spinning one layer onto another layer. This may be accomplished by electrospinning, electroblowing or melt blowing one or more layer(s) onto another layer directly by using one layer as a scrim, i.e., by positioning it on the moving collection belt and passing it beneath the spin pack during the fiber formation process.

The spacer can alternatively be formed by overlaying one or more nanofiber layer(s) as described above onto a paper layer, such as a layer of cellulosic paper.

Usually high voltage capacitors require thicker and denser spacers to maintain the electrical insulation between the electrodes. The resistance of these spacers is usually high, which leads to high ESR capacitors. The use of thinner spacers as permitted by the invention can result in capacitors having low ESR for use in high voltage devices.

Test Methods

In the non-limiting examples that follow, the following test methods were employed to determine various reported characteristics and properties. ASTM refers to the American Society of Testing Materials. ISO refers to the International Standards Organization. TAPPI refers to Technical Association of Pulp and Paper Industry.

Basis Weight was determined by ASTM D-3776, which is hereby incorporated by reference and reported in g/m².

Density of the spacer was calculated by dividing the basis weight of the sample in g/m2 by the thickness of the sample in micrometers.

Fiber Diameter was determined as follows. Ten scanning electron microscope (SEM) images at 5,000× magnification were taken of each nanofiber layer sample. The diameter of eleven (11) clearly distinguishable nanofibers were measured from the photographs and recorded. Defects were not included (i.e., lumps of nanofibers, polymer drops, intersections of nanofibers). The average fiber diameter for each sample was calculated.

Thickness was determined by ASTM D1777, which is hereby incorporated by reference.

Ionic Resistance in organic electrolyte is a measure of a spacer's resistance to the flow of ions, and was determined as follows. Samples were cut into small pieces (1.5 cm diameter) and soaked in 2 M solution of LiCl in methanol electrolyte. The spacer resistance was measured using Solartron 1287 Electrochemical Interface along with Solartron 1252 Frequency Response Analyzer and the Zplot software. The test cell had a 0.3165 square cm electrode area that contacts the wetted spacer. Measurements were done at AC amplitude of 10 mV and the frequency range of 10 Hz to 500,000 Hz. The high frequency intercept in the Nyquist plot was the spacer resistance (in ohms). The spacer resistance (ohms) was multiplied with the electrode area (0.3165 square cm) to determine ionic resistance in ohms-cm².

Frazier Air Permeability is a measure of air permeability of porous materials and is reported in units of ft³/min/ft². It measures the volume of air flow through a material at a differential pressure of 0.5 inches (12.7 mm) of the water. An orifice is mounted in a vacuum system to restrict flow of air through sample to a measurable amount. The size of the orifice depends on the porosity of the material. Frazier permeability is measured in units of ft³/min/ft² using a Sherman W. Frazier Co. dual manometer with calibrated orifice, and converted to units of m³/min/m². At low Frazier air permeability levels, i.e., about 1 cfm/ft² (0.30 m³/min/m²) and less, the air permeability of a sheet material is more accurately measured as Gurley Hill porosity, and is expressed in seconds/100 cc. The approximate relationship of Gurley Hill porosity to Frazier air permeability may be expressed as:

Gurley Hill Porosity (in seconds)×Frazier (in cfm/ft²) =3.1

Gurley Hill Porosity is the time required for a given volume of air (100 cc) to pass through an area of material (one square inch (6.45 cm²)) under a pressure of approximately 4.9 inches (12.45 cm) of water. Gurley Hill Porosity was determined by TAPPI T460/ASTM D726, which is hereby incorporated by reference and reported in seconds.

Liquid Absorption is the measure of the liquid absorption capacity of the spacer. Silicon oil (obtained from Dow Corning, 200® Fluid, 10 CST, polydimethylsiloxane) was used for this test. Spacers were cut into thin strips (1 in (2.54 cm) wide and 8 in (20.3 cm) long) and then markings were made 1 inch (2.54 cm) from each end. The spacers were placed into a weigh dish containing silica oil and allowed to soak completely submersed for 5 minutes. The spacers were then allowed to hang over an empty weigh dish for 20 hours so that all excess oil was drained off. The outer 1 inch (2.54 cm) was cut from the strip to yield a 1×6 in (2.54×15.2 cm) strip. The weight difference between the dried and wet spacer was used to calculate the percentage liquid absorption using this formula:

Percentage liquid absorption=(wet sample weight−dry sample weight)/dry sample weight×100%

Porosity is the measure of the void volume of the spacer. The following formula was used to calculate porosity:

% porosity=(wet sample weight−dry sample weight)/ [(wet sample weight−dry sample weight)+(dry sample weight×density of oil/density of sample)]×100%; where the density of oil is 0.965 g/cc, the density of cellulosic spacer material used is 1.558 g/cc, and the density of nylon 6,6 spacer material used is 1.14 g/cc.

Liquid Wicking is the measure of the wicking speed of the spacer and corresponds to the wetting speed of the spacer in use within the capacitor. Silicon oil (obtained from Dow Corning, 200® Fluid, 10 CST, polydimethylsiloxane) was used for this test. Spacers were cut into thin strips (1 in (2.54 cm) wide and 8 in (20.3 cm) long) and then draped over a weigh dish filled with oil. The bottom half inch (1.27 cm) of the spacer was dipped in the oil and the top half was draped using a binder clip. The distance traveled by the oil in 1 hour was measured and reported as wicking time in mm/hr.

EXAMPLES

Capacitor spacers useful in capacitors of the present invention will be described in more detail in the following examples.

An electroblowing apparatus as described in International Publication Number WO2003/080905 was used to form nanofiber layers from a solution of nylon 6,6 polymer at 24 weight % in formic acid, and each sample was calendered by the method described in U.S. patent application Ser. No. 11/523,827, which is incorporated by reference herein in its entirety. Two separate samples were formed, one of which is pictured in the scanning electron micrograph of FIG. 1.

Each of the nylon 6, 6 nanofiber spacers is compared with incumbent cellulosic paper spacers and the results are given in Table 1. Examples 1 and 2 are nylon 6, 6 nanofiber spacers, while incumbent cellulosic spacers are Comparative Examples 1-4. Both of the nylon 6, 6 spacers are made with nanofibers having an average fiber diameter of 255 nm. The spacers of the invention have a more uniform and consistent structure than the incumbent spacers without any trace of impurities. This is especially apparent in Comparative Examples 3 and 4 which have very open structures made with large fibers.

Comparative Examples 1 and 2 are commercially available spacers having a dense structure useful to provide protection against shorts, while the spacers of Comparative Examples 3 and 4 are commercially available open structures useful to absorb lot of electrolyte. Usually spacers in Comparative Examples 3 and 4 are placed adjacent to the anode, while the spacers in Comparative Examples 1 and 2 are placed next to the cathode. In such a multilayer spacer, spacers from Comparative Examples 1 and 2 are combined with spacers of Comparative Examples 3 and 4 to provide good protection against shorts and electrolyte absorption. In contrast, the thin nanofiber spacers of Examples 1 and 2 provide a large surface area which absorbs a large amount of electrolyte.

TABLE 1

| Example | Thickness (μm) | Basis Weight (g/m²) | Mean Pore Size (μm) | Max Pore size (μm) | Density (g/cc) | Frazier Air Permeability cfm/ft² (m³/min/m²) | Gurley Hill Porosity (seconds) | Ionic Resistance* (ohm-cm²) | Liquid Wicking (mm/hr) | Liquid Absorption (%) | Porosity (%) |
|---|---|---|---|---|---|---|---|---|---|---|---|
| 1 | 57.9 | 21 | 1.046 | 2.445 | 0.363 | 2.5 | 1.24 | 0.87 | 49.03 | 171.83 | 66.97 |
| 2 | 29.1 | 11.6 | 1.13 | 2.997 | 0.3986 | 2.74 | 1.13 | 0.59 | 42.13 | 113.95 | 57.36 |
| Comp. Ex. 1 | 23.5 | 15.9 | Too small to measure | Too small to measure | 0.676 | <0.01 | >300 | 20.3 | 3.18 | 25.48 | 29.1 |
| Comp. Ex. 2 | 16.5 | 15.2 | Too small to measure | Too small to measure | 0.921 | 0.09 | 33.9 | 20.1 | 1.04 | 20.94 | 25.23 |
| Comp. Ex. 3 | 34.2 | 15.5 | 16.3 | 57.6 | 0.453 | 23.4 | 0.5 | 1.2 | 1.67 | 49.4 | 44.36 |
| Comp. Ex. 4 | 42.8 | 10.4 | 39.5 | 144.9 | 0.243 | 585 | 0 | 0.6 | 0 | 81.02 | 56.6 |

Figure 2:
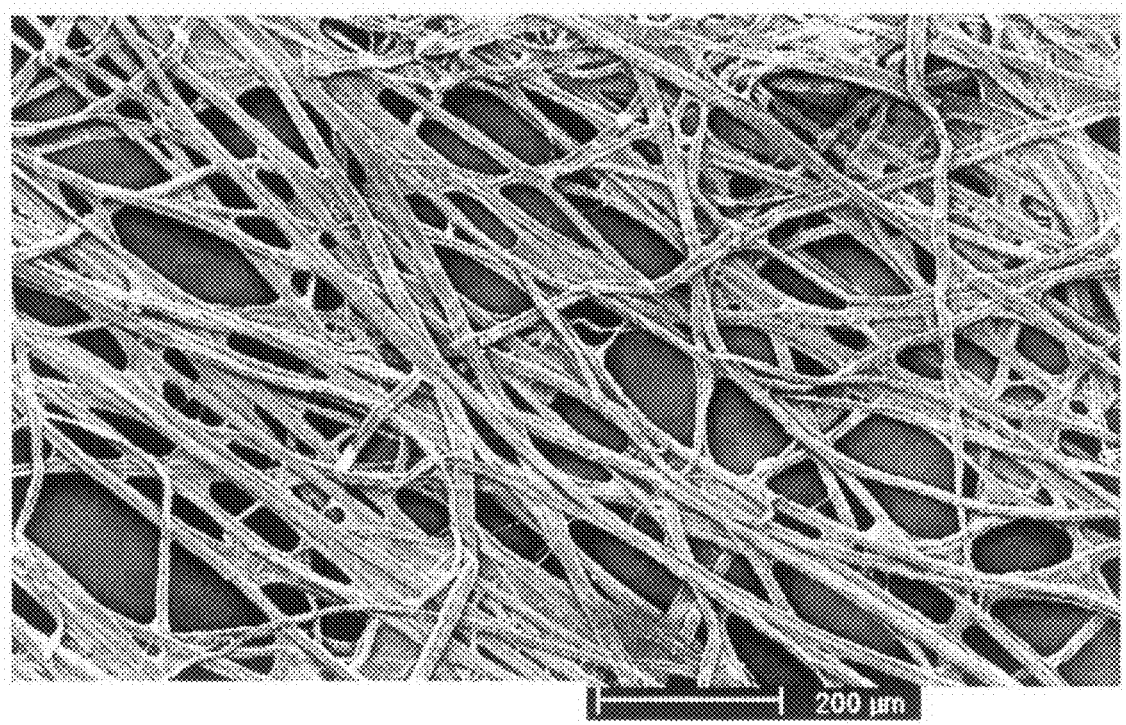
FIG. 2 is a scanning electron micrograph of a paper component of an aluminum electrolytic capacitor spacer in accordance with the prior art. The spacer is a very open structure, which offers low resistance but very poor barrier properties.
Figure 3:
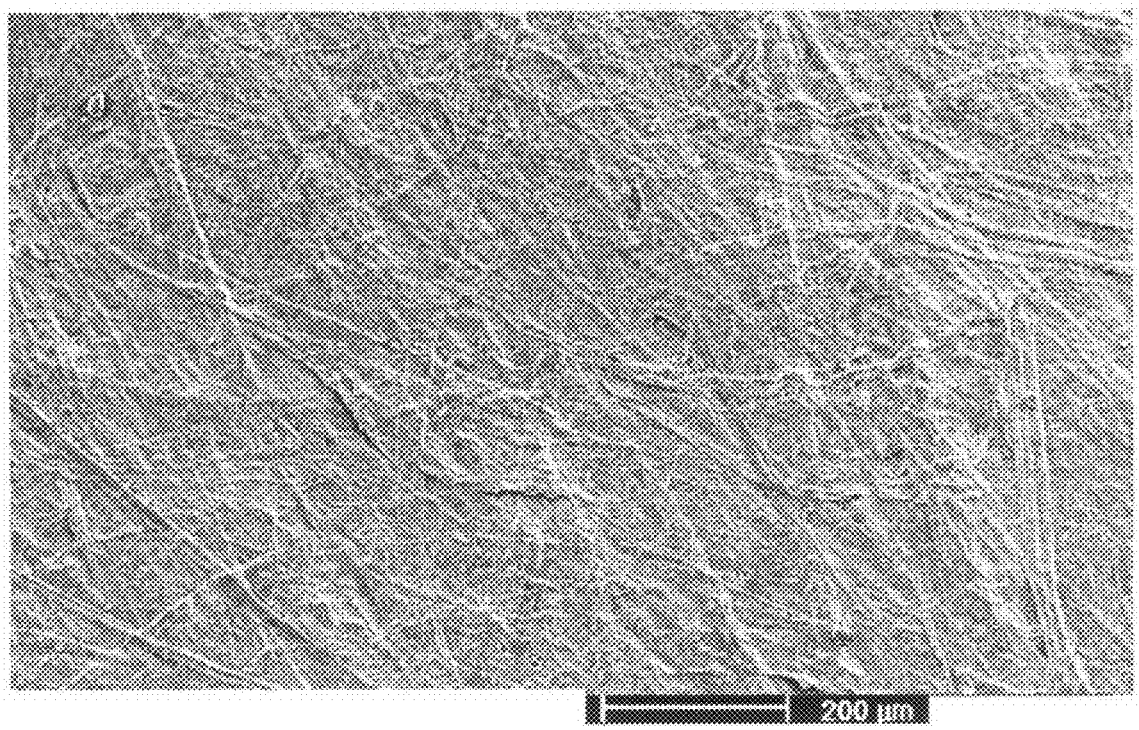
FIG. 3 is a scanning electron micrograph of another paper component of an aluminum electrolytic capacitor spacer in accordance with the prior art. The spacer offers a closed structure, which offers very good barrier properties but offer very high resistance.

Comparative Examples 1 and 2 have a very dense structure as shown by small pore size, low Frazier air permeability and high Gurley Hill porosity, as can be seen in the data and in the scanning electron micrograph shown in FIG. 3. This results in good barrier properties but very high ionic resistance, which leads to high ESR capacitors with poor electrical performance and high heat generation. These incumbent spacers have low absorbance of electrolyte and poor wicking properties. On the other hand, Comparative Examples 3 and 4 have a very open structure as shown by large pore size, high Frazier air permeability and low Gurley Hill porosity. These incumbent spacers absorb more electrolyte but the wicking properties are still poor, as can be seen in the data and in the scanning electron micrograph shown in FIG. 2. This results in good electrolyte absorption and low ionic resistance, but does not provide protection against short-circuiting.

The spacers in Comparative Examples 1 and 4 can be combined and used as a multilayer spacer in capacitors, however the ionic resistance would be limited by the spacer of Comparative Example 1 and the resistance of the combined spacer will be either same or slightly higher and the resistance of Comparative Example 1. Multiple layers of paper spacers are conventionally used in aluminum electrolytic capacitor, which leads to high ESR capacitors.

The nylon 6,6 nanofiber spacers of Examples 1 and 2 provide an improved balance of good electrical properties and barrier properties as shown by low ionic resistance, small pore size, low Frazier permeability and Gurley Hill porosity, and as can be seen in the scanning electron micrograph shown in FIG. 1. In addition these examples absorb a large amount of electrolyte and have good wicking properties, allowing the use of a thinner spacer resulting in higher capacitance devices as more electrodes can be added in place of spacers. The spacers of Examples 1 and 2 have significantly lower ESR and good barrier properties against short-circuiting as demonstrated by small pore size and air permeability.

The invention also can improve capacitor manufacturing efficiency since a single layer spacer can be used in place of multiple layer spacers and since the wetting speed of spacers is improved.

What is claimed is:

1. An aluminum electrolytic capacitor comprising a spacer comprising a porous nanofiber layer comprising fibers having a mean diameter in the range from about 50 nm to about 1000 nm, wherein the porous nanofiber layer has a mean flow pore size of between about 0.01 μm and about 5 μm, a thickness of between about 1 μm and about 90 μm, a porosity of between about 20% and about 90%, and a Frazier air permeability of less than about 25 cfm/ft² (7.6 m³/min/m²).

2. The aluminum electrolytic capacitor of claim 1 wherein the spacer has an ionic resistance less than about 2 ohms-cm² in 2 molar lithium chloride in methanol electrolyte solution.

3. The aluminum electrolytic capacitor of claim 1 wherein the fibers are formed of a polymer selected from the list consisting of aliphatic polyamide, semi-aromatic polyamide, polyvinyl alcohol, cellulose, polypropylene, polyethylene, polyethylene terephthalate, polypropylene terephthalate, polybutylene terephthalate, polysulfone, polyvinylidene fluoride, polyvinylidene fluoride-hexafluoropropylene, polymethyl pentene, polyphenylene sulfide, polytetrafluoroethylene, ethylene tetrafluoroethylene, polyacetyl, polyurethane, aromatic polyamide and blends, mixtures and copolymers thereof.

4. The aluminum electrolytic capacitor of claim 1 further comprising a liquid electrolyte or a conductive polymer electrolyte.

5. The aluminum electrolytic capacitor of claim 1 wherein the spacer comprises multiple porous nanofiber layers.

6. The aluminum electrolytic capacitor of claim 5 wherein the spacer comprises multiple porous nanofiber layers comprising differing polymers.

7. The aluminum electrolytic capacitor of claim 5 wherein the spacer comprises multiple porous nanofiber layers having differing characteristics selected from the list consisting of thickness, basis weight, pore size, fiber size, porosity, air permeability, ionic resistance and tensile strength.

8. The aluminum electrolytic capacitor of claim 1 wherein the spacer comprises at least one porous nanofiber layer and at least one paper layer.

9. The aluminum electrolytic capacitor of claim 1 wherein the spacer is sandwiched between two conducting aluminum foils wherein one of the aluminum foils is coated with an insulating oxide layer, wherein the capacitor is saturated with a liquid electrolyte comprising a solvent and a solute.

* * * * *